July 25, 1933.   E. MAYER ET AL   1,919,982
COMPASS
Filed Aug. 7, 1930

Inventors:
Emil Mayer,
Ernst Brüche,
by Charles E. Tulla
Their Attorney.

Patented July 25, 1933

1,919,982

UNITED STATES PATENT OFFICE

EMIL MAYER, OF BERLIN-SCHLACHTENSEE, AND ERNST BRÜCHE, OF BERLIN-REINICKENDORF, GERMANY, ASSIGNORS TO GENERAL ELECTRIC COMPANY, A CORPORATION OF NEW YORK

COMPASS

Application filed August 7, 1930, Serial No. 473,709, and in Germany August 16, 1929.

The present invention relates to a compass which amongst other things is particularly adapted for aircraft.

The magnetic compasses commonly used heretofore for the purposes of aerial navigation have several inherent disadvantages. The post which served to mount the needle is unfavorably stressed when the airplane is banking due to the presence of lateral acceleration forces; the liquid used for damping the movement of the needle is subject to being frozen because of the low temperatures prevailing at high altitudes; and the relatively great inertia of the needle which, as in the case of all mechanical instruments, does not register small deviations from the chosen direction such for example as those which arise as a result of squalls.

In carrying this invention into effect in one form thereof the influence of the horizontal component of the earth's magnetic field upon a cathode ray, i. e., the ability of the earth's field to deflect a cathode ray from its normal position is utilized to provide indication of the direction of the earth's magnetic field. A cathode ray compass avoids all of the above-mentioned disadvantages. It possesses no friction, has no damping liquid and has no inertia. Furthermore, it can be conveniently constructed as a remote indicating compass so that it can be mounted at a distance from the cockpit and preferably at a point in the rear of the fuselage of the aircraft where the magnetic disturbances due to the magnetic materials of the motor are practically insignificant.

The constructional form described in the following specification in the case of which the cathode ray lies in the vertical direction is particularly advantageous because the indication of the direction of the earth's magnetic field can be indicated upon a horizontal screen having the usual markings of the wind rose magnetic compass card. This, however, is not absolutely necessary since the advantages of the cathode ray compass as stated above are obviously quite independent of any particular orientation of the ray with respect to the terrestrial field.

Figure 1:
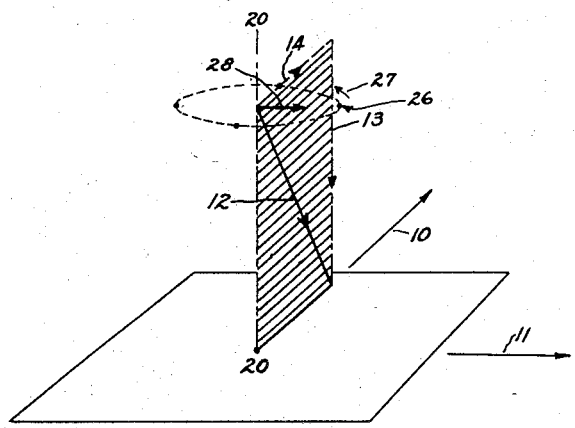
Figure 2:
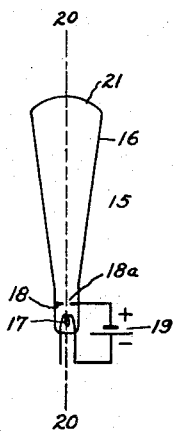
Figure 3:
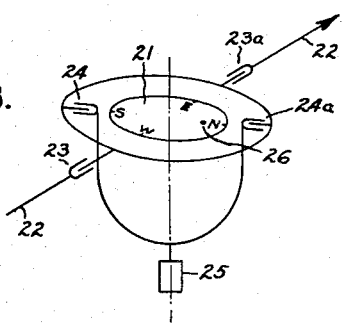

For a better and more complete understanding of our invention reference should be had to the following specification and to the accompanying drawing in which Fig. 1 is an explanatory diagram; Fig. 2 is a simple diagrammatic sketch of a cathode ray tube utilized as a compass; and Fig. 3 is a diagrammatic view of a cardan suspension for mounting the compass upon any craft such for example as an airplane.

Referring now to the diagram shown in Fig. 1 the north and east directions as measured on the earth's surface are respectively represented by the arrows 10 and 11. The direction of the earth's magnetic field is designated by the vector 12 and the vertical and horizontal components of the terrestrial field are respectively represented by the vectors 13 and 14.

The electric discharge device 15 employed in carrying this invention into effect is known as a "cathode ray tube" and comprises an evacuated envelope 16 in which a small quantity of a suitable inert gas such for example as argon is introduced after the envelope has been exhausted; the pressure of this gas being approximately .003 mm. As shown, the discharge device 15 is provided with a small concentrated filamentary cathode 17 which is heated to a suitable electron emitting temperature by current supplied thereto from any suitable external source such for example as a low voltage battery (not shown). This filamentary cathode is made of a suitable metal such as platinum and is preferably coated with an oxide such as barium oxide; the oxide coating serving in a well understood manner to increase the electron emission from the cathode. The discharge device is also provided with an anode 18 which may be made of any suitable metal such as nickel or molybdenum and the anode is maintained at a positive potential relative to the cathode, by means of any suitable source of electromotive force such as the battery 19; the anode being connected to the positive terminal of the battery and the cathode 17 being connected to the negative terminal thereof.

As shown, in the drawing the anode 18 is located in the neck of the envelope 16 close to the cathode 17 and is provided with a small central opening 18a on the central vertical, or longitudinal axis 20, 20 of the envelope.

It will be understood by persons skilled in the art that an electric discharge device constructed in the above described manner will function as a cathode ray tube. That is to say, most of the electrons emitted from the cathode will be attracted toward and will flow into the anode. However, due to the speed and inertia of the electrons flowing along the central axis 20, 20 a finely defined stream or ray of electrons will pass through opening 18a and in the absence of any magnetic field will pass along the central axis 20, 20 toward the flared end of the envelope.

Since a cathode ray, i. e., a stream of electrons is invisible to the eye it is necessary to provide some means for visualizing this ray and for this purpose a fluorescent screen 21 made of a suitable fluorescent material such for example as calcium tungstate or zinc sulphide is attached to the flared end of the envelope 16 by any suitable binding material such as water glass. When the cathode ray falls upon the fluorescent screen 21 the speed at which the ray impinges thereon becomes fluorescent. The presence of the inert gas within the envelope 16 serves to prevent the screen 21 from becoming charged by this ray by permitting the charge to leak slowly back to the anode.

As shown in Fig. 3 the fluorescent screen 21 is provided with the cardinal markings of the usual magnetic compass card.

In Fig. 3 a suitable gimbal ring or cardan joint suspension arrangement is shown which serves to maintain the longitudinal axis 20, 20 of the tube in the vertical direction with the fluorescent screen 21 on the flared end uppermost despite the roll or pitch of the craft. Assuming that the longitudinal axis of the body of the aircraft is represented by the reference arrow 22, the pivots 23, 23a permit of rotation of the craft about the longitudinal or fore and aft axis of the craft, whilst the pivots 24, 24a permit of the rotation of the craft about a lateral or transverse axis without disturbing the position of the cathode ray tube.

A weight 25 in combination with these pivots serves to maintain the longitudinal axis of the cathode ray tube in the vertical direction. Thus for example in the case of unaccelerated gliding flight the so-called inclination error is avoided.

As pointed out above, in the absence of a magnetic field a cathode ray passes through the central opening 18a in the anode and coincides with the longitudinal axis 20, 20 of the envelope. Thus, in the construction in Figs. 2 and 3 the ray will be vertical. As is well understood a cathode ray will be deflected from its normal position by a magnetic field which is perpendicular to the direction of the ray. Consequently since a vertical ray is parallel to the vertical component of the earth's field and therefore not subject to its influence the ray will be influenced only by the horizontal component and will be deflected from its normal vertical position in a plane which is perpendicular to the horizontal component of the earth's field. That is to say, the ray will be deflected from the vertical and will lie in the east-west plane.

This phenomenon of deflection of a cathode ray in a magnetic field such as the earth's field is utilized in the following manner to indicate the direction of a body such as a ship or airplane with respect to the direction of the horizontal component of the earth's magnetic field. The cardan suspension shown in Fig. 3 supporting the cathode ray tube is so mounted on the airplane that the east-west line of the compass card on the fluorescent screen is perpendicular with the longitudinal or fore and aft axis of the craft, the direction of which is represented by the arrow 22.

The cathode ray tube in Fig. 2 is mounted like a Brown tube without deflection plates and is adjusted with its longitudinal axis 20, 20 in the perpendicular and is therefore parallel with the vertical component of the earth's magnetic field. In order to indicate the deflection direction, it is necessary to draw a plane through the direction of the undeflected ray, i. e., the vertically maintained axis of the envelope 16 and the horizontal component of the earth's magnetic field which is vertical thereto. This plane is therefore a north-south plane and is shown patched in Fig. 1. The deflection of the ray due to the influence of the horizontal component of the field then takes place vertically to this plane, that is, in the direction indicated by the reference arrow 28. Assuming that the fore and aft axis of the body of the aircraft is located in the direction of the horizontal component 14, that is, the aircraft is flying a due northerly course, then the cathode ray lies in an east-west plane and is deflected from its vertical position so as to impinge upon the fluorescent screen at a point 26 near the "N" marking, thus providing an indication to an observer that the fore and aft axis of the craft is pointing north. Correspondingly with a deviation of the craft toward the right from the due northerly course the point 26 at which the cathode ray impinges upon the fluorescent screen will, due to the rotation of the fluorescent screen, appear to move in the direction indicated by the arrow 27. When the craft is pointed due east the point of impingement of the ray upon the screen will reach the point marked "E" thus indicating to an observer that the craft is pointed east.

What we claim as new and desire to secure by Letters Patent of the United States is:

1. A compass comprising a fluorescent screen provided with compass markings, an electric discharge device comprising an envelope provided with an electron emitting cathode and with an anode arranged between said cathode and said screen and at a substantial distance from said screen, said anode being provided with an opening for directing a ray of electrons on said screen, and means for mounting said device to provide emission in a vertical direction and deflection of said electron ray from the vertical by the earth's magnetic field so that the point at which the ray impinges on said screen indicates the direction of the axis of the earth's magnetic field.

2. A compass comprising an electric discharge device having an envelope provided at one extremity with a fluorescent screen having compass markings thereon and provided with an electron emitting cathode and an anode arranged between said cathode and said screen and at a greater distance from said screen than from said cathode, said anode being provided with an opening for directing a ray of electrons in the longitudinal direction of said envelope against said screen, and means for mounting said discharge device with the longitudinal axis of said envelope substantially vertical to provide for deflection of said ray from the vertical by the earth's magnetic field so that the point of impingement of said ray upon said screen indicates the direction of the earth's magnetic field.

EMIL MAYER.
ERNST BRÜCHE.